(12) United States Patent
Snobl

(10) Patent No.: US 6,561,533 B2
(45) Date of Patent: May 13, 2003

(54) BICYCLE TOWING AND HITCHING APPARATUS

(76) Inventor: David M. Snobl, 804 S. 9th Ave., St. Charles, IL (US) 60174

( * ) Notice: Subject to any disclaimer, the term of this patent is extended or adjusted under 35 U.S.C. 154(b) by 0 days.

(21) Appl. No.: 09/918,850

(22) Filed: Jul. 31, 2001

(65) Prior Publication Data
US 2003/0025295 A1 Feb. 6, 2003

(51) Int. Cl.⁷ .............................................. B62K 27/00
(52) U.S. Cl. ....................... 280/204; 280/7.16; 280/292; 280/239; 280/415.1; 280/490.1
(58) Field of Search ................................. 280/402, 204, 280/292, 239, 411.1, 415.1, 490.1, 493, 494, 7.16

(56) References Cited

U.S. PATENT DOCUMENTS

| | | | | |
|---|---|---|---|---|
| 552,907 A | * | 1/1896 | Jakobson | 280/7.16 |
| 624,678 A | * | 5/1899 | Planes | 280/204 |
| 730,193 A | * | 6/1903 | Parker | 280/204 |
| 1,453,190 A | | 4/1923 | Sands | |
| 2,271,255 A | | 1/1942 | Du Bois | 280/7.16 |
| 2,468,894 A | * | 5/1949 | Peek | 280/204 |
| 3,934,666 A | * | 1/1976 | Ellington | 180/11 |
| 4,077,646 A | * | 3/1978 | Watkins | 280/204 |
| 4,114,919 A | * | 9/1978 | Stowe | 280/292 |
| 4,266,793 A | * | 5/1981 | Pryor | 280/204 |
| 4,458,908 A | | 7/1984 | Strong | 280/239 |
| 5,039,120 A | | 8/1991 | Stowe | 280/204 |
| 5,067,738 A | | 11/1991 | O'Connor | 280/204 |
| 5,076,600 A | * | 12/1991 | Fake | 280/204 |
| 5,259,634 A | * | 11/1993 | Berner et al. | 280/204 |
| 5,330,217 A | * | 7/1994 | McCarthy | 280/204 |
| 5,372,371 A | | 12/1994 | Larson | 280/7.16 |
| 5,470,088 A | | 11/1995 | Adams | 280/204 |
| 5,716,065 A | | 2/1998 | Liu | 280/204 |
| 5,743,543 A | * | 4/1998 | Chiu | 280/231 |
| 5,785,335 A | | 7/1998 | George | 280/204 |
| 5,842,710 A | | 12/1998 | Couture | 280/204 |
| 5,860,662 A | | 1/1999 | Bartoshesky et al. | 280/204 |
| 5,938,223 A | | 8/1999 | Kotlier | 280/204 |
| 6,155,582 A | * | 12/2000 | Bourbeau | 280/204 |

FOREIGN PATENT DOCUMENTS

WO    WO 97/252240    * 7/1997    .................. 280/204

OTHER PUBLICATIONS

"Allycat" Trailer Bicycle depicted on p. 7 of *Cycling Guide*.
Schwinn "Fastback" Trailer Bicycle depicted on p. 70 of 1999 Schwinn Catalog and page from Schwinn website.
"Piccolo" Trailer Bicycle depicted in 2000 Burley website.

* cited by examiner

Primary Examiner—Lesley D. Morris
Assistant Examiner—Daniel Yeagley
(74) Attorney, Agent, or Firm—Olson & Hierl, Ltd.

(57) ABSTRACT

An apparatus for hitching two bicycles together including a first hitch which connects the apparatus to one of the bicycles and a second hitch which connects the apparatus to the second bicycle. The second hitch includes a stem which is slid through and secured to the head tube of the second bicycle after the front fork and wheel have been removed from the second bicycle.

18 Claims, 4 Drawing Sheets

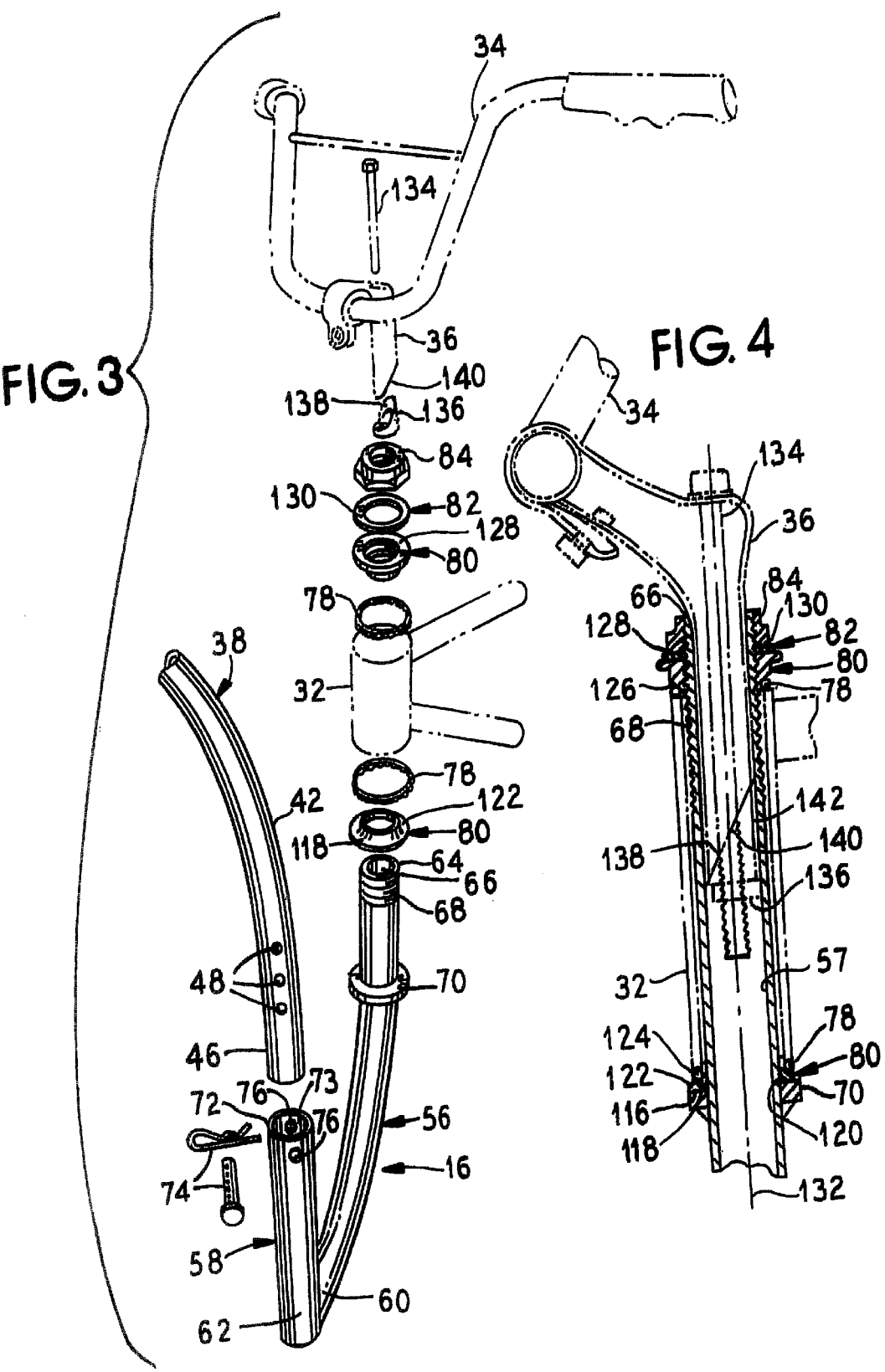

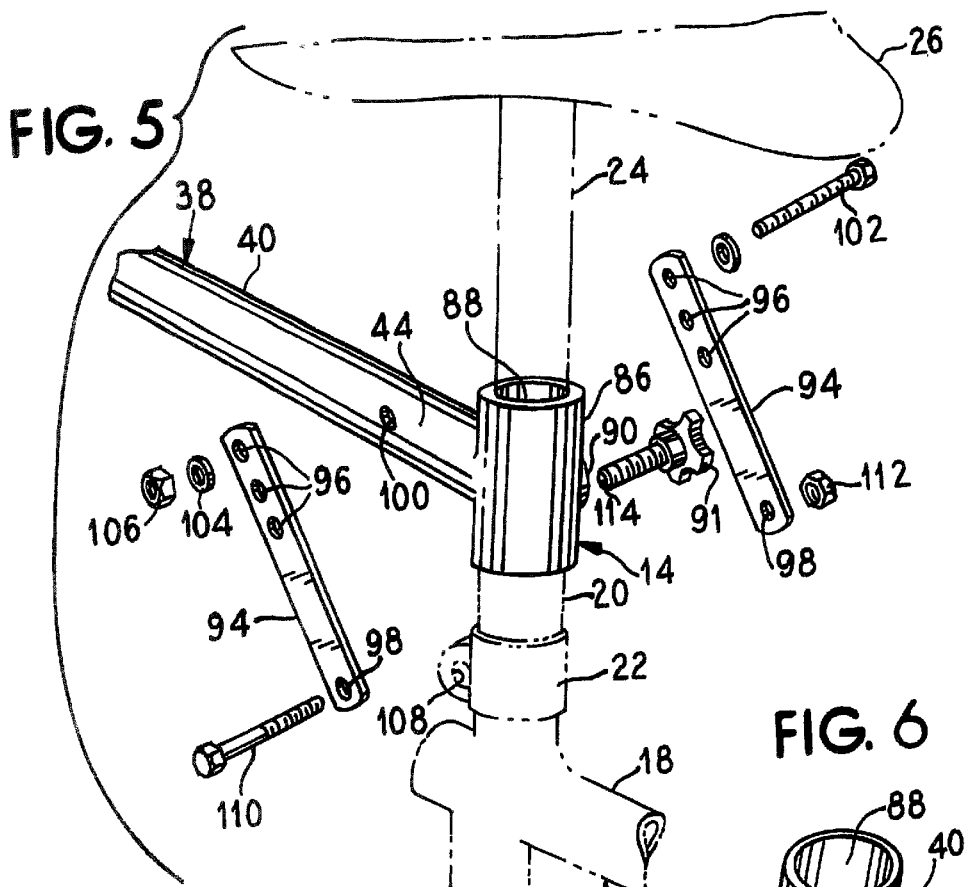

BICYCLE TOWING AND HITCHING APPARATUS

FIELD OF THE INVENTION

The present invention relates generally to bicycles and, more particularly, to an apparatus for hitching a towed bicycle or the like vehicle to a towing bicycle.

BACKGROUND OF THE INVENTION

A number of hitches and other devices are known for connecting two bicycles together or for creating a tandem bicycle. See, for example, U.S. Pat. Nos. 5,067,738; 5,470,088; 5,716,065; 5,785,335; and 5,938,223 which all disclose tandem bicycles where the rear or towed bicycle unit includes, among other elements, a hitch or frame which connects the towed bicycle unit to the seat post of the forward or towing bicycle.

A disadvantage associated with this type of hitching device however is that it requires the purchase of a combination hitch and rear bicycle unit which has no practical usefulness other than in connection with the creation of a tandem bicycle unit. Because the tandem bicycle units described in each of the above-identified patents are particularly suitable in applications where the rear bicycle unit is structured for use by a child, the usefulness of the rear bicycle unit ends when the child decides that he/she wants to ride his/her own bicycle without being towed. A new bicycle must then be purchased for the child.

This particular disadvantage has sought to be addressed by other hitches which allow an ordinary bicycle to be modified or used in a manner which allows the same to double as the rear bicycle unit of a tandem bicycle. See, for example, the tandem bicycle units and hitches disclosed in U.S. Pat. Nos. 4,458,908; 5,039,120; 5,372,371; and 5,860,662 which each require the removal of the front wheel of the rear bicycle unit before the bicycle can be used as the rear bicycle unit of a tandem bicycle.

One disadvantage associated with these hitch devices, however, is that they must incorporate special couplings and multiple intricate parts to allow the towed bicycle to tilt, articulate and bend independently of the towing bicycle.

The present invention is directed to a hitching and towing apparatus which uses an existing bicycle as the rear bicycle unit and incorporates a simple and inexpensive hitch which is slid through and connected to the head tube of the towed bicycle.

SUMMARY OF THE INVENTION

The present invention contemplates an apparatus for hitching a towed bicycle including a head tube to a towing bicycle. The apparatus includes a frame connected at one end to the towing bicycle and a hitch at the other end including a stem which is adapted to be slid through and secured to the head tube of the towed bicycle for connecting the apparatus to the towed bicycle.

In accordance with the present invention, the hitch also includes a hollow sleeve and the other end of the frame is adapted to be slid and secured in the sleeve of the hitch. The stem and the sleeve of the hitch are joined together at the ends thereof, as by a weld or the like, and the stem extends angularly upwardly away from the sleeve.

The stem also includes a collar which defines a stop which limits the distance which the stem extends through the head tube of the towed bicycle. Moreover, a threaded upper end on the stem is adapted to receive a threaded lock nut for securing the hitch to the head tube of the towed bicycle.

The apparatus further includes a pair of bearings on the stem of the hitch whereby, when said stem is slid through the head tube of the towed bicycle, one of the bearings is positioned between the collar and the lower end of the head tube of the towed bicycle and the other of the bearings is positioned between the lock nut and the upper end of the head tube of the towed bicycle. The bearings allow the stem to articulate and pivot about the head tube of the towed bicycle which, in turn, allows the towed bicycle to turn and articulate in response to the turning and articulation of the towing bicycle.

A second hitch associated with the one end of the frame connects the apparatus to the seat post of the towing bicycle.

Other features and advantages of the present invention will become readily apparent from the following detailed description, the appended drawings, and the accompanying claims.

BRIEF DESCRIPTION OF THE DRAWINGS

In the drawings,

FIG. 3 is an enlarged, broken, perspective, exploded view of one of the hitches of the bicycle towing apparatus of the present invention depicting the connection thereof to the head tube and the neck of the handle bars of the towing bicycle, the frame and handle bars of the towed bicycle being shown in phantom and broken away;

FIG. 4 is a broken vertical cross-sectional view depicting the connection of the hitch of FIG. 3 to the head tube of the towed bicycle, the head tube and the handle bars of the towed bicycle being shown in phantom;

FIG. 5 is an enlarged broken perspective view of the other hitch of the bicycle towing apparatus of the present invention depicting the connection thereof to the seat post of the towing bicycle which is shown broken and in phantom;

FIG. 6 is an enlarged broken perspective view of the collar of the hitch of the present invention shown in FIG. 5; and FIG. 7 is an enlarged, broken, front elevational view of an alternate bracket structure for hitching a wagon or the like structure.

DESCRIPTION OF THE PREFERRED EMBODIMENTS

Figure 1:
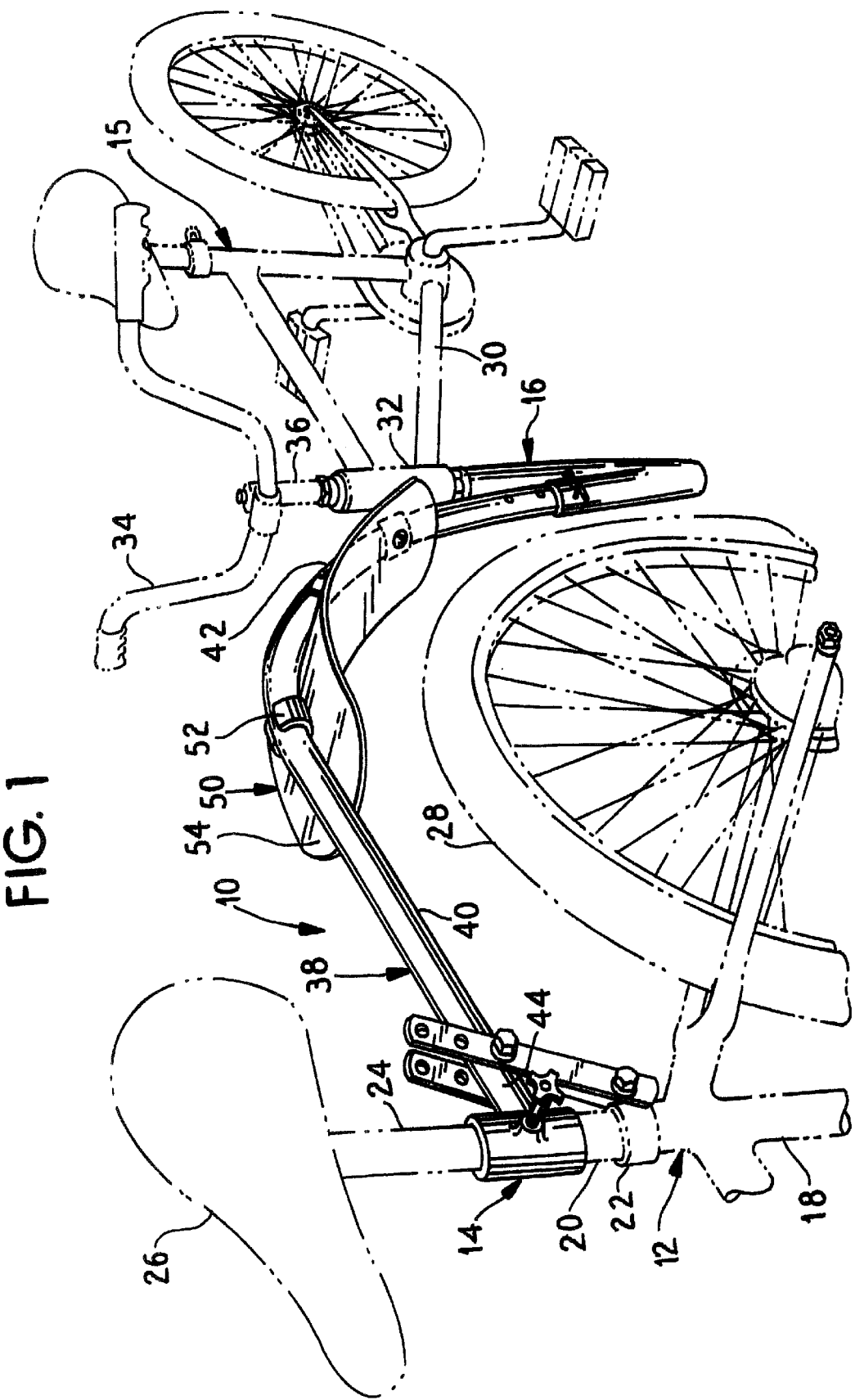
FIG. 1 is a perspective view of a towed bicycle and towing bicycle, both shown in phantom, hitched together by the bicycle towing apparatus of the present invention.

The invention disclosed herein is, of course, susceptible of embodiment in may different forms. Shown in the drawings and described herein below in detail are preferred embodiments of the invention. It is to be understood, however, that the present disclosure is an exemplification of the principles of the invention and does not limit the invention to the illustrated embodiments.

For ease of description, the towing and hitching apparatus of the present invention is described herein below in its usual vertical position hitched between a towing bicycle and a towed bicycle and terms such as upper, lower, vertical, etc., will be used herein with reference to this usual position.

Moreover, it is understood that the figures herein do not necessarily show details of either the towing bicycle or the towed bicycle that are known in the art and that will be recognized by those skilled in the art as such. The detailed descriptions of such elements are not necessary to an understanding of the invention. Accordingly, such elements are herein represented only to the degree necessary to aid in an understanding of the features of the present invention.

Referring now to the drawings and, more particularly to FIG. 1, the hitching and towing apparatus of the present invention is depicted therein and generally designated 10, and is shown coupled at one end to a towing or lead bicycle 12 by a hitch 14 and coupled at the opposite end to a towed or trailer bicycle 15 by a hitch 16.

The towing or lead bicycle 12 depicted in FIG. 1 is a conventional bicycle which includes, among other elements, a frame 18, a seat collar 20, a seat collar bracket 22, a seat post 24, a seat 26, and a rear wheel 28.

The towed or trailer bicycle 15 depicted in FIG. 1 is also in the form of a conventional children's bicycle except that the front wheel and the front fork thereof have been removed therefrom to allow the same to be used in connection with the hitching and towing apparatus 10 of the present invention. The trailer bicycle 15 includes, among other elements, a frame 30 including a front head tube 32 and handle bars 34 mounted on a neck 36 which extends and is tightened inside the head tube 32.

Figure 2:
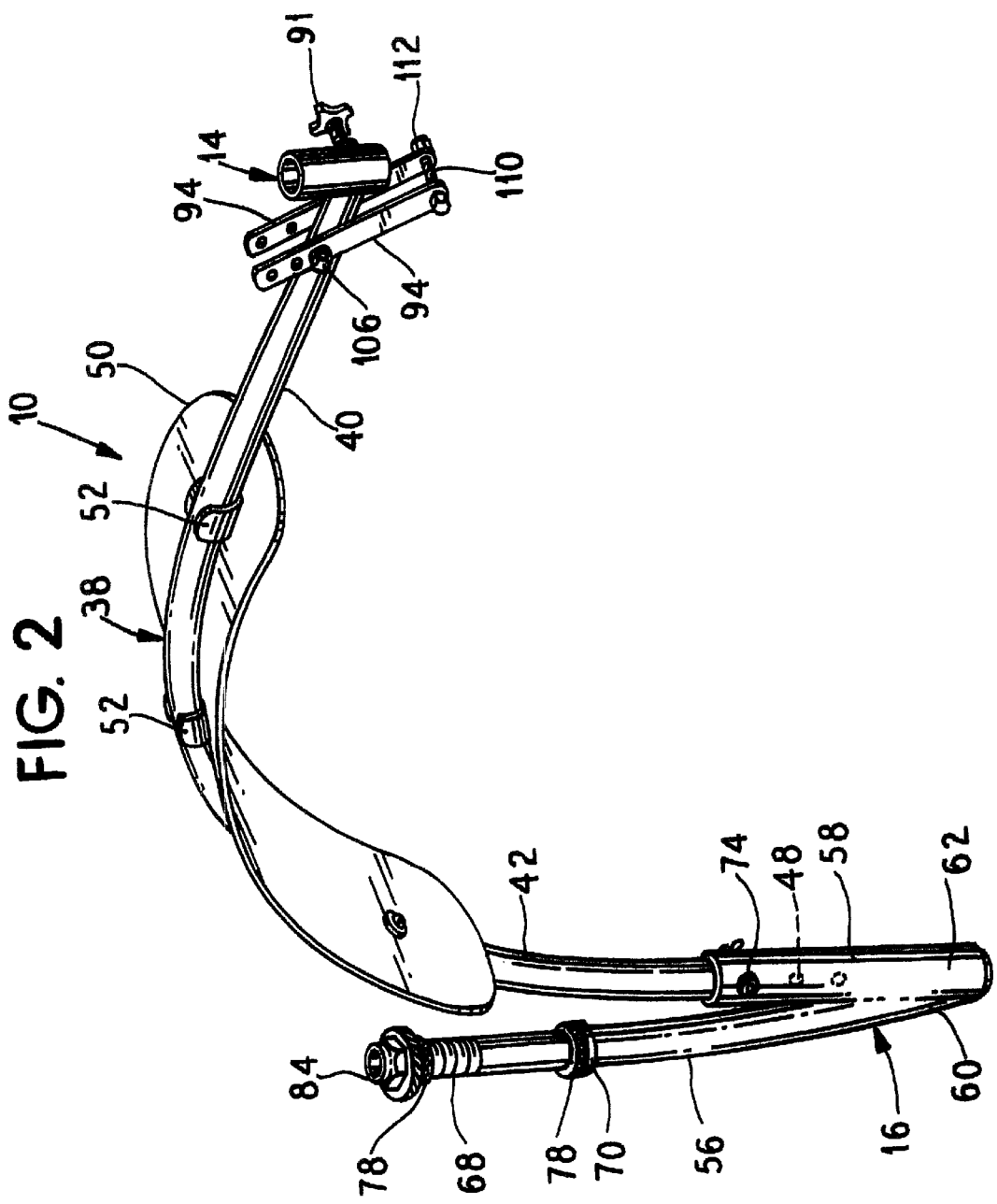
FIG. 2 is a perspective view of the bicycle towing apparatus of the present invention.

As shown in FIGS. 1 and 2, the towing apparatus 10 of the present invention includes a frame 38 which, in the embodiment shown, is in the form of an elongate curved hollow tube including a first arm 40 and a second arm 42 unitary therewith. One end 44 of the first arm 40 incorporates the unitary hitch 14 which connects the arm 40, and thus the towing apparatus 10, to the seat post 24 of the towing bicycle 12. The arm 40 extends generally horizontally outwardly from the seat post 24 of the towing bicycle 12 and above and spaced from the rear wheel 28 of the lead bicycle 12.

As shown in FIGS. 1–3, the second arm 42 comprises a bent or curved section of the tubular frame 38 which extends curvilinearly downwardly, from the end of the arm 40 opposite the end 44, around and spaced from the back of the rear wheel 28 of the lead bicycle 12. The arm 42 terminates in a generally vertically oriented tubular end section 46 which includes a plurality of vertically aligned spaced-apart through apertures 48.

The towing apparatus 10 further includes a splash guard 50 in the form of an elongate flap made of a flexible, lightweight plastic or the like material which extends below the frame 38 along the curve formed by the arms 40 and 42. Clips 52, which are secured to the outer face 54 of the guard 50, mount the splash guard 50 to the frame 38.

Referring to FIGS. 2–4, the hitch assembly 16 includes a generally curved elongate tubular hollow shaft or stem 56 and a hollow tubular generally straight and vertically extending sleeve 58 which are interconnected together at their respective lower proximal ends 60 and 62 thereof as by a weld or the like. The stem 56 includes an interior cylindrical surface 57 defining a circular opening in the upper end 64 thereof and a hollow interior cylindrically shaped cavity 66. The stem 56 also includes an upper threaded peripheral and circumferentially extending end surface 68. The stem 56 still further includes a collar 70 which extends radially outwardly from, and extends circumferentially around, the outer peripheral surface of the stem 56 at a point generally spaced from the lower edge of the upper threaded peripheral end surface 68.

The sleeve 58, which generally has a diameter greater than the diameter of the stem 56, includes an interior cylindrical surface defining a circular opening in the upper end 72 thereof and a hollow interior cylindrical cavity 73. In the embodiment shown, the stem 56 and the sleeve 58 are vertically co-planarly aligned and the stem 56 is at least twice the length of the sleeve 58. Moreover, the stem 56 is angularly spaced from the sleeve 58 at approximately a twenty five (25) degree angle to generally define a "v" shaped hitch 16.

As shown in FIGS. 3 and 4, a retaining or locking pin 74 is adapted to be extended through aligned apertures 76 formed in the diametrically opposed sides of the body of the sleeve 58 adjacent the upper end 72 thereof.

The hitch 16 additionally includes a pair of ring ball bearings 78, a pair of ring collars 80, a washer 82, and a threaded lock nut 84, all of which are adapted to be mounted and slid over the upper end 64 of the stem 56 as will be described in more detail below.

Turning now to FIG. 5, the hitch 14 includes a hollow tube neck 86 which extends unitarily outwardly from the end 44 of the first arm 40 and is oriented generally normally relative to the arm 40 to allow the seat post 24 of the lead bicycle 12 to be slid therethrough as also described below in more detail. Particularly, the neck 86 includes an interior cylindrical surface defining a cylindrical open bore 88 extending therethrough.

A collar 90 extends unitarily generally normally outwardly from the outer surface of the neck 86 and includes a threaded interior cylindrical surface (not shown) which is in communication with the interior bore 88 in the neck 86. A turn screw knob 91 including a unitary threaded screw 92 is adapted to be threaded into the interior of the collar 90 and into the bore 88 of the neck 86.

As shown in FIGS. 2 and 5, the hitch 14 further includes a pair of elongate flat braces 94 which are diametrically opposed to each other and are adapted to be secured to the opposite sides of the arm 40 adjacent the end 44 thereof. A plurality of spaced-apart aligned top apertures 96 and a bottom aperture 98 extend through the body of each of the braces 94 adjacent the respective ends thereof. A bore 100 extends through the body of the arm 40 adjacent the end 44 thereof. The respective braces 94 are secured to the end 44 of the arm 40 by a threaded bolt 102 which extends successively through one of the top apertures 96 in one of the braces 94, then through the bore 100 in the arm 40, and then through one of the top apertures 96 in the other of the braces 94. A washer 104 and a nut 106 are threaded onto the end of the bolt 102 to secure the braces 94 to the arm 40.

The hitch 14 is connected and secured to the lead bicycle 12 as shown in FIG. 5 and described below. Initially, and although not shown, the seat 26 is removed from the lead bicycle 12 by first loosening the seat collar bracket 22 on the lead bicycle 12 and then sliding the seat post 24 out of the seat collar 20. The seat post 24 is then slid through the tube neck 86 of the hitch 14 and the seat post 24 is then reinserted into the interior of the seat collar 20.

Thereafter, the braces 94 and, more particularly, the respective lower mounting apertures 98 therein are aligned with respective mounting holes 108 located in the seat collar bracket 22 of the towing bicycle and a threaded bolt 110 is extended successively through the mounting aperture 98 in one of the braces 94, then through the mounting holes 108 in the seat collar bracket 22, and then through the aperture 98 in the other of the braces 94. A nut 112 is then threaded onto the end of the bolt 110 which tightens the seat collar bracket 22 about the seat collar 20, tightens the braces 94 to the seat collar bracket 22, and thus tightens the seat post 24 to the seat collar 20.

Additionally, the knob 91 on the neck 86 is rotated until the radial end face 114 of the screw 92 contacts and is tightened against the outer surface of the seat post 24 thus also securing the hitch 14 to the seat post 24.

The hitch 16 is connected and secured to the trailer bicycle 15 as shown in FIG. 2, 3 and 4 and as described in detail below. Initially, and although not shown in any of the figures, it is understood that the front wheel, the front fork and the handle bars 34 of the trailer bicycle 15 must first be disassembled and removed from the head tube 32 thereof. Then, and as shown in FIGS. 3 and 4, the hitch 16 is ready to be mounted to the head tube 32 and initially the bottom ring collar 80 is slid down through the upper end 64 of the stem 56 into the position shown in FIG. 4 where a lower radial face 116 of the base 118 of the bottom or lower ring collar 80 is seated against the top radial face 120 of the collar 70 surrounding the stem 56. The bottom or lower ring bearing 78 is then likewise slid down and through the upper end 64 of the stem 56 into the position of FIG. 4 wherein the lower ring bearing 78 is seated against the top radial face 122 of the base 118 of the bottom ring collar 80. Then, the stem 56 of the hitch 16 is slid upwardly through the interior of the head tube 32 to a position wherein a lower radial end face 124 of the head tube 32 is seated against the upper radial face of the lower ring bearing 78 and the upper threaded end 64 of the stem 56 extends through the top of the head tube 32.

The upper ring bearing 78 is then slid down and over the upper end 64 of the stem 56 and the upper ring collar 80 is subsequently threaded onto the threaded end 68 of the stem 56 so that the upper ring bearing 78 is sandwiched between the upper radial end face of the head tube 32 and the lower radial end face 126 of the ring collar 80. Thereafter, the washer 82 is slid over the upper end 64 of the stem 56 into abutting relationship with the upper radial end face 128 of the ring collar 80 and then the lock nut 84 is threaded down and over the upper end 64 of the stem 56 into abutting relationship with the upper radial face 130 of the washer 82 to complete the process of securing the stem 56 and thus the hitch 16 to the towed bicycle 15.

In accordance with the present invention, the placement of the ball ring bearings 78 relative to the stem 56 and the head tube 32 as described above advantageously allows for the rotational and pivotal movement of the stem 56 about the vertical axis 132 of the head tube 32.

The handle bars 34 of the towed bicycle 15 are then secured to the hitch 16 and the head tube 32 by sliding the neck 36 thereof successively through the central apertures defined in the lock nut 84, the washer 82, the upper ring bearing 78, and the interior cavity 66 defined in the stem 56. A standard bicycle threaded neck pin 134 is then slid through the interior of the neck 36 and is threaded into a neck nut 136 positioned at the distal end of the neck 36. The continued threading of the pin 134 into the nut 136 causes the upper angled face 138 of the nut 136 to contact the lower angled complimentarily orientated face 140 of the neck 36 which causes the nut 136 to move outwardly and upwardly against the face 140 of the neck 36 until the outer peripheral surface 142 of the nut 136 contacts and is locked against the interior surface 57 of the stem 56. The still continued threading of the pin 134 causes the peripheral outer surface of the neck 36 and the peripheral outer surface 142 of the nut 136 to exert pressure against the interior surface 57 of the stem 56 thus locking the neck 36 within the stem 56.

Thus, in accordance with the present invention, the neck 36 and the stem 56 are coupled together for joint pivotable and rotational movement about the head tube vertical axis 132 so as to allow the trailer bicycle 15 to turn and articulate in response to the turning or the articulation of the lead bicycle 12.

Once the hitch 16 has been secured to the head tube 32 of the trailer bicycle 15, the arm 42 and, more particularly, the end section 46 thereof, is extended into the cavity 74 defined in the sleeve 58 and one of the apertures 48 in the end section 46 is aligned with the respective apertures 46 formed in the end of the sleeve 58. The pin 74 is then extended through the respective apertures to secure the frame 38 to the hitch 16. The distance between the ground and the hitch 16 and thus the height of the trailer bicycle 15 relative to the ground can be varied depending upon which of the three apertures 48 is selected during the assembly process.

FIG. 7 depicts an alternate hitch embodiment 216 wherein a "C" clamp 250 is hingedly secured to the outer surface of the sleeve 258 to allow a wagon (not shown) or the like to be hitched to the towing bicycle 12. The clamp 250 includes an arm 252 which is hingedly mounted at one end 253 to the sleeve 258 and also a generally C-shaped unitary bracket 254 extending outwardly from the other end 260 of the arm 52. The bracket 254 includes a generally horizontally orientated outwardly extending upper unitary finger 262 and a lower hooked finger 264 spaced therefrom and unitary therewith. The upper finger 262 includes a threaded bore (not shown) extending between the top and bottom faces thereof and a threaded screw 266 extends through the bore. The rotation of the screw 266 relative to the finger 262 causes the screw 266 to move either towards or away from the lower hooked finger 264 so as to either open or close the opening defined by the bracket 254. The bracket 254 is adapted to be hitched to the handle of a wagon or the like.

What has thus been described is a towing and hitching apparatus including a simple hitch which incorporates a stem which is easily slid into and connected to the head tube of a trailer bicycle from which the front wheel, front fork and handle bars have been removed. Whenever so desired, the front wheel, front fork and handle bars may advantageously be reassembled so as to allow the bicycle to be used again as a standard bicycle rather than as a trailer bicycle in connection with the towing and hitching apparatus of the present invention.

I claim:

1. An apparatus for hitching a towed bicycle to a towing bicycle, the towed bicycle including handle bars having a neck adapted to extend through a head tube and the apparatus comprising a frame connected at one end to the towing bicycle and a hitch at the other end including a hollow stem adapted to be slid through and secured to the head tube of the towed bicycle for connecting the apparatus to the towed bicycle and said hollow stem being adapted to receive therein the neck of the handle bars of the towed bicycle.

2. The apparatus of claim 1, wherein said hitch also includes a hollow sleeve and said other end of said frame is adapted to be slid and secured in said sleeve of said hitch.

3. The apparatus of claim 2, wherein said stem and said sleeve of said hitch are joined together at the ends thereof and said stem extends upwardly away from said sleeve at approximately a twenty five (25) degree angle and defining a generally v-shaped hitch.

4. An apparatus for hitching a towed bicycle including a head tube to a towing bicycle, the apparatus comprising a frame connected at one end to the towing bicycle and a hitch at the other end including a hollow stem adapted to be slid through and secured to the head tube of the towed bicycle for connecting the apparatus to the towed bicycle, said hitch also including a hollow sleeve and said other end of said frame being adapted to be slid and secured in said sleeve of said hitch and the other end of said frame including a plurality of spaced apart apertures and said sleeve including a pin adapted to be inserted into a desired one of said apertures for varying the height of said hitch relative to said frame.

5. The apparatus of claim 1, wherein said stem includes a collar defining a stop which limits the distance which said stem extends through the head tube of the towed bicycle.

6. The apparatus of claim 5, wherein said stem includes a threaded upper end which receives a threaded lock nut for securing said hitch to the head tube of the towed bicycle.

7. The apparatus of claim 6, further comprising a pair of bearings on said stem of said hitch whereby, when said stem is slid through the head tube of the towed bicycle, one of said bearings is positioned between said collar and the lower end of the head tube of the towed bicycle and the other of said bearings is positioned between said lock nut and the upper end of the head tube of the towed bicycle.

8. An apparatus for hitching a towed bicycle including a head tube to a towing bicycle, the apparatus comprising:
   an arm including respective ends;
   a first hitch at one of said ends of said arm for securing said apparatus to the towing bicycle;
   a second hitch at the other of said ends of said arm for securing said apparatus to the towed bicycle, said second hitch including an elongate shaft and an elongate hollow sleeve unitary therewith, said other of said ends of said arm being generally vertically removably and adjustably extendable into said sleeve for adjusting the height of said second hitch relative to said arm and said shaft extending through and being secured to the head tube of the towed bicycle.

9. The apparatus of claim 8, wherein said shaft and said sleeve are joined together at the ends thereof and said shaft extends upwardly away from said sleeve at approximately a twenty five (25) degree angle to define a generally v-shaped hitch.

10. An apparatus for hitching a towed bicycle including a head tube to a towing bicycle, the apparatus comprising:
   an arm including respective ends;
   a first hitch at one of said ends of said arm for securing said apparatus to the towing bicycle;
   a second hitch at the other of said ends of said arm for securing said apparatus to the towed bicycle, said second hitch including an elongate shaft and an elongate hollow sleeve unitary therewith, said one of said ends of said arm extending into said sleeve and said shaft extending through and being secured to the head tube of the towed bicycle, one of said ends of said arm including a plurality of spaced apart apertures and said sleeve including a pin adapted to be inserted into a desired one of said apertures for varying the height of said second hitch relative to said arm.

11. The apparatus of claim 8, wherein said shaft includes a collar defining a stop for limiting the distance which said shaft extends through the head tube of the towed bicycle.

12. The apparatus of claim 8, wherein said shaft includes a threaded upper end which receives a threaded lock nut for securing said second hitch to the head tube of the towed bicycle.

13. The apparatus of claim 12, further comprising a pair of bearings on said shaft of said second hitch whereby, when said shaft is slid through the head tube of the towed bicycle, one of said bearings is positioned between said collar and the lower end of the head tube of the towed bicycle and the other of said bearings is positioned between said lock nut and the upper end of the head tube of the towed bicycle.

14. An apparatus for hitching a towed bicycle including a head tube to a towing bicycle including a seat post, the apparatus comprising:
   a frame including first and second unitary arms, each of the arms includes an end;
   a first hitch at said end of said first arm for connecting said apparatus to the seat post of the towing bicycle, said first arm extending generally horizontally outwardly from said seat post and said second arm extending generally curvilinearly unitarily downwardly from the first arm; and
   a second hitch including a shaft and a hollow sleeve having interconnected lower ends and being angularly disposed relative to one another in a relationship wherein said shaft is adapted to be slid through the lower end of the head tube of the towed bicycle for securing said second hitch to the towed bicycle and said sleeve is adapted to receive the end of said second arm in a generally vertical orientation for removably and adjustably securing said frame to said second hitch and adjusting the height of said second hitch relative to said second arm.

15. An apparatus for hitching a towed bicycle including a head tube to a towing bicycle including a seat post, the apparatus comprising:
   a frame including first and second unitary arms, each of the arms including an end;
   a first hitch at said end of said first arm for connecting said apparatus to the seat post of the towing bicycle, said first arm extending generally horizontally outwardly from said seat post and said second arm extending generally curvilinearly unitarily downwardly from the opposite end of said first arm; and
   a second hitch including a shaft and a hollow sleeve having interconnected lower ends and being angularly disposed relative to one another in a relationship wherein said shaft is adapted to be slid through the lower end of the head tube of the towed bicycle for securing said second hitch to the towed bicycle and said sleeve is adapted to receive the end of said second arm for securing said frame to said second hitch, said end of said second arm including a plurality of spaced apart apertures and said sleeve including a pin adapted to be inserted into a desired one of said apertures for varying the height of said second hitch relative to said second arm.

16. The apparatus of claim 14, wherein said shaft includes a collar defining a stop for limiting the distance which said shaft extends through the head tube of the towed bicycle.

17. The apparatus of claim 14, wherein said shaft includes a threaded upper end which receives a threaded lock nut for securing said second hitch to the head tube of the towed bicycle.

18. The apparatus of claim 17, further comprising a pair of bearings on said shaft of said second hitch whereby, when said shaft is slid through the head tube of the towed bicycle, one of said bearings is positioned between said collar and the lower end of the head tube of the towed bicycle and the other of said bearings is positioned between said lock nut and the upper end of the head tube of the towed bicycle.

* * * * *